United States Patent
DeAscanis et al.

(10) Patent No.: US 10,041,371 B1
(45) Date of Patent: Aug. 7, 2018

(54) IN-SITU MEASUREMENT OF BLADE TIP-TO-SHROUD GAP IN TURBINE ENGINE

(71) Applicant: Siemens Energy, Inc., Orlando, FL (US)

(72) Inventors: Joshua DeAscanis, Oviedo, FL (US); David Letter, Deland, FL (US); Alejandro Bancalari, Casselberry, FL (US); Clifford Hatcher, Jr., Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 562 days.

(21) Appl. No.: 14/615,487

(22) Filed: Feb. 6, 2015

(51) Int. Cl.
  *F01D 21/00* (2006.01)
  *H04N 7/18* (2006.01)
  *G01M 15/14* (2006.01)
  *H04N 5/33* (2006.01)

(52) U.S. Cl.
  CPC .......... *F01D 21/003* (2013.01); *G01M 15/14* (2013.01); *H04N 5/33* (2013.01); *H04N 7/183* (2013.01); *F05D 2220/32* (2013.01); *F05D 2260/83* (2013.01)

(58) Field of Classification Search
  CPC ............. F05D 2260/80; F05D 2260/83; F01D 21/003; F01D 21/20; F01D 11/14; F01D 5/005
  See application file for complete search history.

(56) References Cited

U.S. PATENT DOCUMENTS

| | | | |
|---|---|---|---|
| 4,811,091 A | 3/1989 | Morrison et al. | |
| 5,164,826 A | 12/1992 | Dailey | |
| 5,649,369 A * | 7/1997 | Thoren | F01D 21/04 33/542.1 |
| 5,818,242 A * | 10/1998 | Grzybowski | F01D 11/025 324/642 |
| 5,973,502 A * | 10/1999 | Bailleul | G01B 7/14 324/662 |
| 6,009,189 A | 12/1999 | Schaack | |
| 6,532,840 B2 * | 3/2003 | Hatley | B25J 5/00 356/241.1 |

(Continued)

OTHER PUBLICATIONS

No author given; Title: "Micro-Epsilon gapCONTROL // Non-contact gap measurement"; pdf specification sheet published worldwide at www.micro-epsilon.com by Micro-Epsilon, which is headquartered in Ortenburg, Germany; pp. 1-16; no publication date given.

*Primary Examiner* — Dwayne J White
*Assistant Examiner* — Adam W Brown

(57) ABSTRACT

A robotically articulated inspection scope (56, 69) inserted into a pilot fuel nozzle port (58) of a turbine engine (20) for in-situ measurement of gaps (59) between tips of turbine blades (40A) and the surrounding shroud (44). A non-contact gap measuring device (52) on a distal end (79) of the scope may be navigated through a combustor (28) and transition duct (34) into a position proximate a blade tip gap. The scope may be controlled via computer (68) via a robotic drive (66) affixed to the pilot fuel nozzle port. Multiple scopes may be used to measure gaps (59A-D) at multiple azimuths of the turbine simultaneously. The turbine disk (37) may be rotated on its operating turning gear to sequentially measure each blade at each azimuth. The computer may memorize an interactively navigated path for subsequent automated positioning.

2 Claims, 5 Drawing Sheets

(56) References Cited

U.S. PATENT DOCUMENTS

| | | | |
|---|---|---|---|
| 6,575,011 B1 | 6/2003 | Busby et al. | |
| 6,867,586 B2 | 3/2005 | Hatcher et al. | |
| 6,992,315 B2 * | 1/2006 | Twerdochlib | F01D 5/005 250/330 |
| 7,455,495 B2 * | 11/2008 | Leogrande | F01D 11/24 415/1 |
| 7,487,596 B2 | 2/2009 | Nash | |
| 8,164,761 B2 * | 4/2012 | Kominsky | F01D 11/20 250/559.22 |
| 8,654,315 B2 | 2/2014 | Kaminsky | |
| 8,786,848 B2 | 7/2014 | Hatcher et al. | |
| 8,922,640 B2 * | 12/2014 | Hatcher | F01D 21/003 348/159 |
| 9,513,117 B2 * | 12/2016 | Ruhge | G01B 21/16 |
| 2005/0073673 A1 | 4/2005 | Devitt et al. | |
| 2013/0192353 A1 * | 8/2013 | Hatcher | F01D 21/003 73/112.01 |
| 2013/0194413 A1 | 8/2013 | Hatcher et al. | |
| 2013/0335530 A1 | 12/2013 | Hatcher, Jr. et al. | |
| 2013/0335549 A1 * | 12/2013 | Hatcher, Jr. | G02B 23/2484 348/82 |
| 2015/0075265 A1 * | 3/2015 | Memmer | F01D 11/14 73/112.01 |
| 2015/0300920 A1 * | 10/2015 | DeAscanis | G01M 15/14 356/614 |

\* cited by examiner

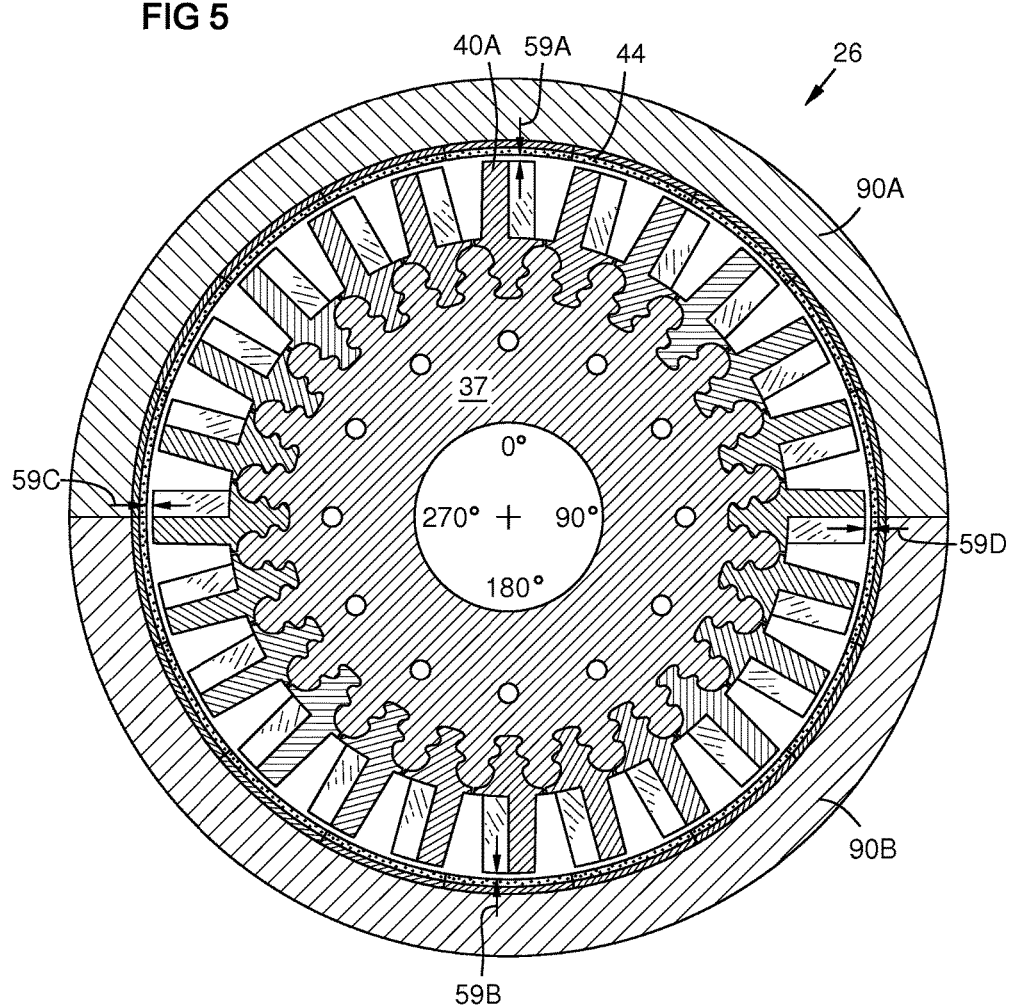

US 10,041,371 B1

IN-SITU MEASUREMENT OF BLADE TIP-TO-SHROUD GAP IN TURBINE ENGINE

FIELD OF THE INVENTION

This invention relates generally to the field of gas turbine engine inspections, and more particularly to the measurement of clearance between gas turbine blade tips and the surrounding gas path shroud, and specifically to an apparatus and method for making such measurements in-situ without disassembly of the engine casing.

BACKGROUND OF THE INVENTION

Gas turbine engines commonly have one or more combustors surrounding the engine shaft between a forward compressor and an aft turbine. The turbine has one or more circular arrays of rotating blades alternating axially with stationary vanes. Combustion gas from the combustors is ducted to the first row of turbine blades. Critical clearance exists between the blade tips and the surrounding combustion gas path shroud. An increase in this clearance reduces engine efficiency and indicates wear. Current methods for measuring blade tip clearance require removal of at least the upper half of the turbine outer casing, and the use of feeler gauges. However, removing the casing changes stresses in the engine such that the measurement may not accurately represent the clearances in the assembled turbine.

BRIEF DESCRIPTION OF THE DRAWINGS

The invention is explained in the following description in view of the drawings that show:

FIG. 5 is a transverse sectional view of a turbine disk showing exemplary multiple blade tip gap measuring positions.

DETAILED DESCRIPTION OF THE INVENTION

Figure 1:
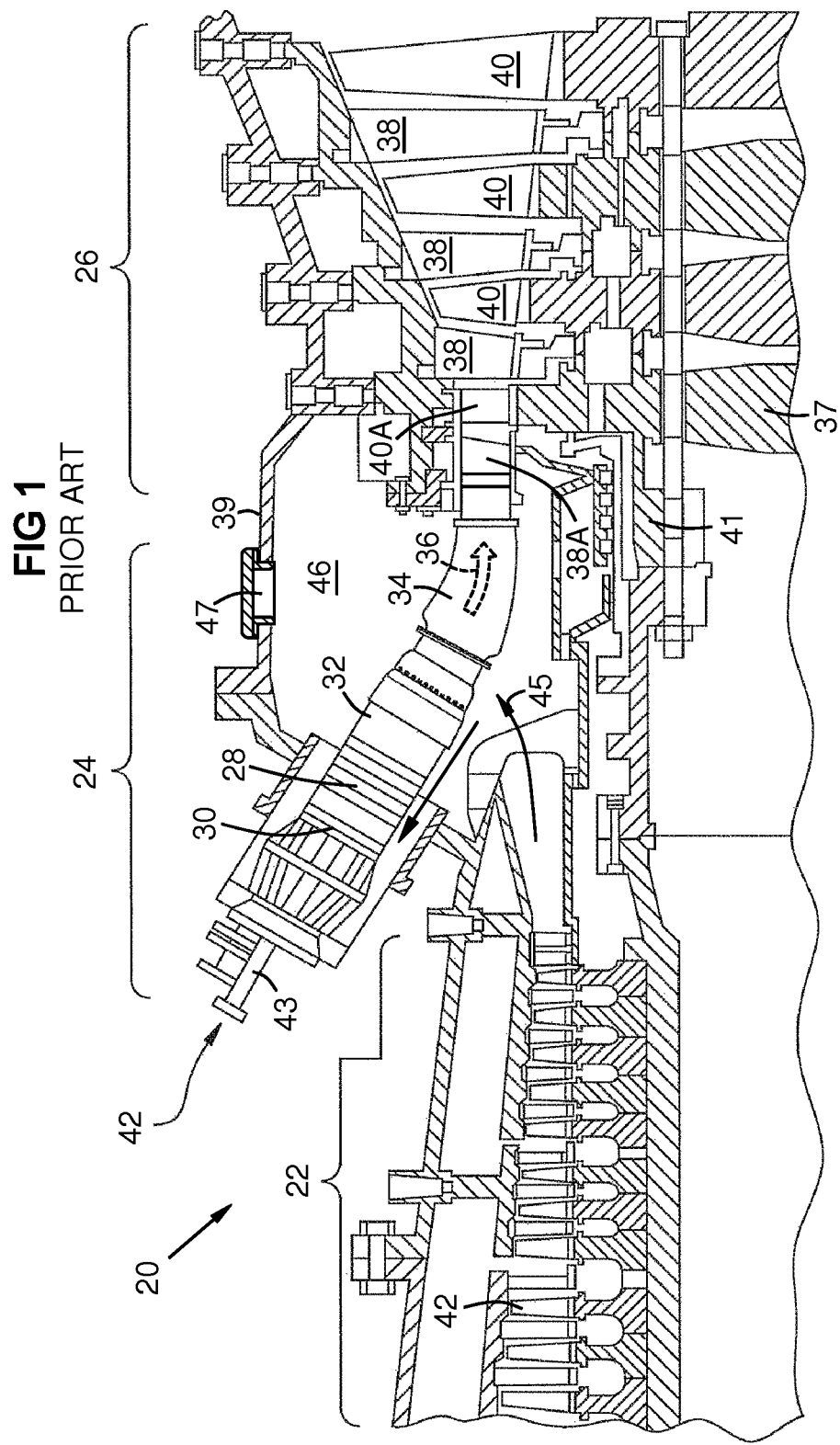
FIG. 1 is a partial sectional side view of an upper half of a gas turbine engine known in the art.

FIG. 1 is a partial side sectional view of an upper portion of a gas turbine engine 20 with a compressor section 22, a combustion section 24, and a turbine section 26 as known in the art. One combustor 28 of a circular array of combustors is shown. Each combustor has an upstream end 30 and a downstream end 32. A transition duct 34 transfers the combustion gas 36 from the combustor to the first row of airfoils of the turbine section 26. The turbine section includes stationary vanes 38 and rotating blades 40. The first row of airfoils may be a circular array of stationary vanes 38A. This is followed by a first row of rotating blades 40A mounted on a disk 37 attached to a turbine shaft 41 that drives the compressor blades 42. Pilot fuel 42 enters each combustor via a central pilot fuel nozzle 43. Compressed air 45 enters a plenum 46 around the combustors. It then enters the upstream end 30 of the combustor, and is mixed with fuel therein for combustion. The compressed air 45 also surrounds the combustor 28 and transition duct 34 to cool them. It has a higher pressure than the combustion gas 36 in the combustor and in the transition duct. Maintenance access ports 47 are provided at various locations on the engine, including on the outer casing 39 of the combustion section as shown.

Figure 2:
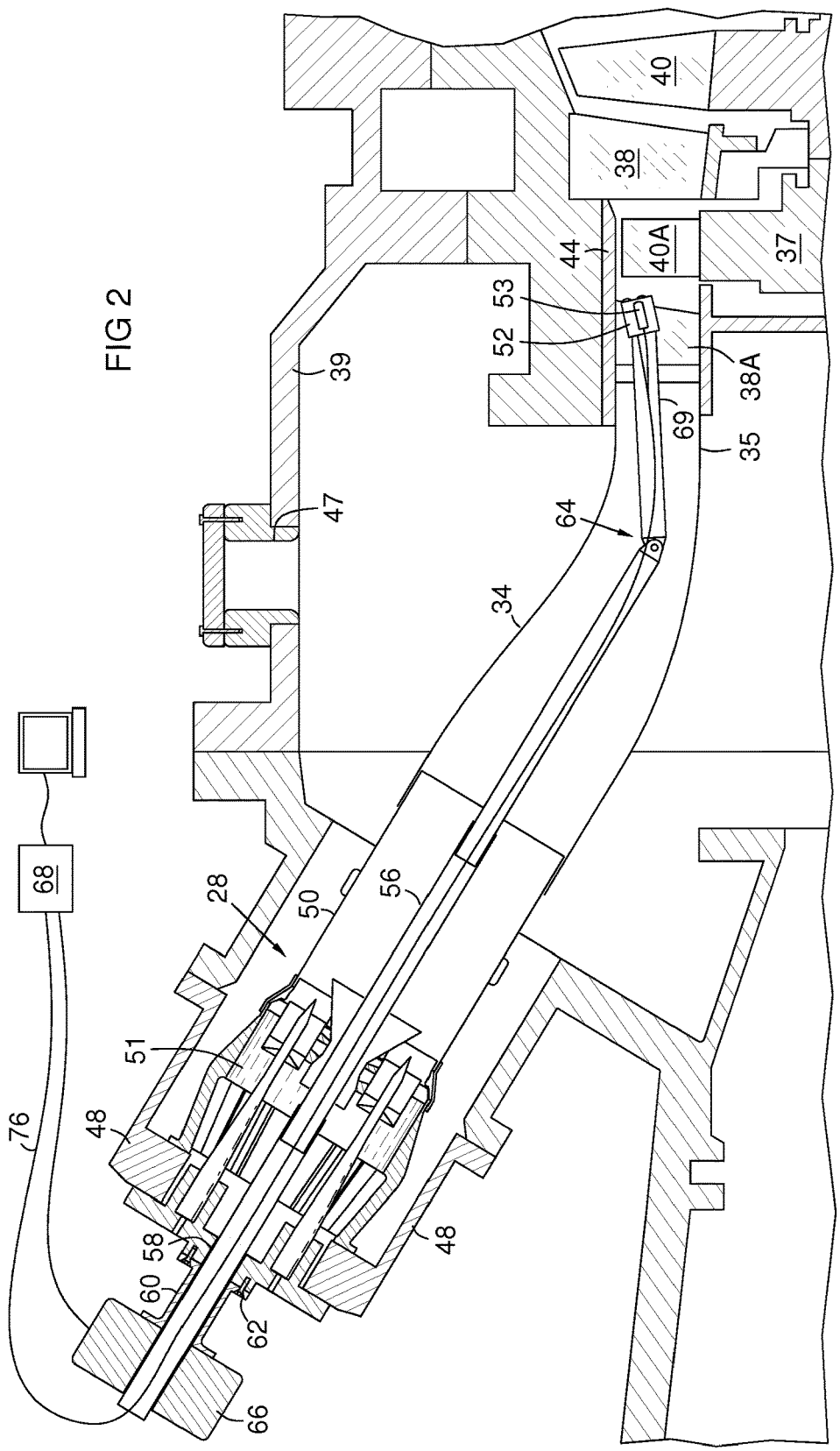
FIG. 2 is a sectional side view of an inspection scope inserted through a combustor and transition duct showing aspects of an embodiment of the invention.

FIG. 2 shows a combustor assembly 28 including a combustion chamber 50 affixed to a combustor cap 51 that is mounted in a combustor support housing 48. The pilot fuel nozzle 43 of FIG. 1 has been removed from the pilot fuel nozzle port 58, and an elongated inspection scope 56, 69 is inserted into the port, extending through the combustor cap 51, combustion chamber 50, and transition duct 34. A mounting tube 60 for the inspection scope may be affixed to the pilot fuel nozzle port 58 via a collar 62 or other means. The collar may be rotationally indexed to the port by an indexing mark or key in order to establish the rotational orientation of the inspection scope relative to the combustor for repeatable automatic navigation. A computer 68 may control the scope robotically via a motorized drive 66 to extend through the combustor and navigate to the position shown. This can be done for example as taught in US patent application publication 2013/0335530A1, which is incorporated herein by reference or by other robotic mechanisms. Herein "robotically" means controllably operated by a computer along an automated predetermined navigation path and/or operated interactively under human direction via the computer. The scope may have a distal arm 69 robotically articulated at a pivot joint 64 connected to a distal end of an upper arm 56 of the inspection scope. A non-contact gap identification and measuring device 52 is mounted on the distal end of the distal arm 69 with a video camera 53 for visual navigation via the computer 68 to measure the gap between the tip of a blade 40A and the surrounding gas path shroud 44.

Figure 3:
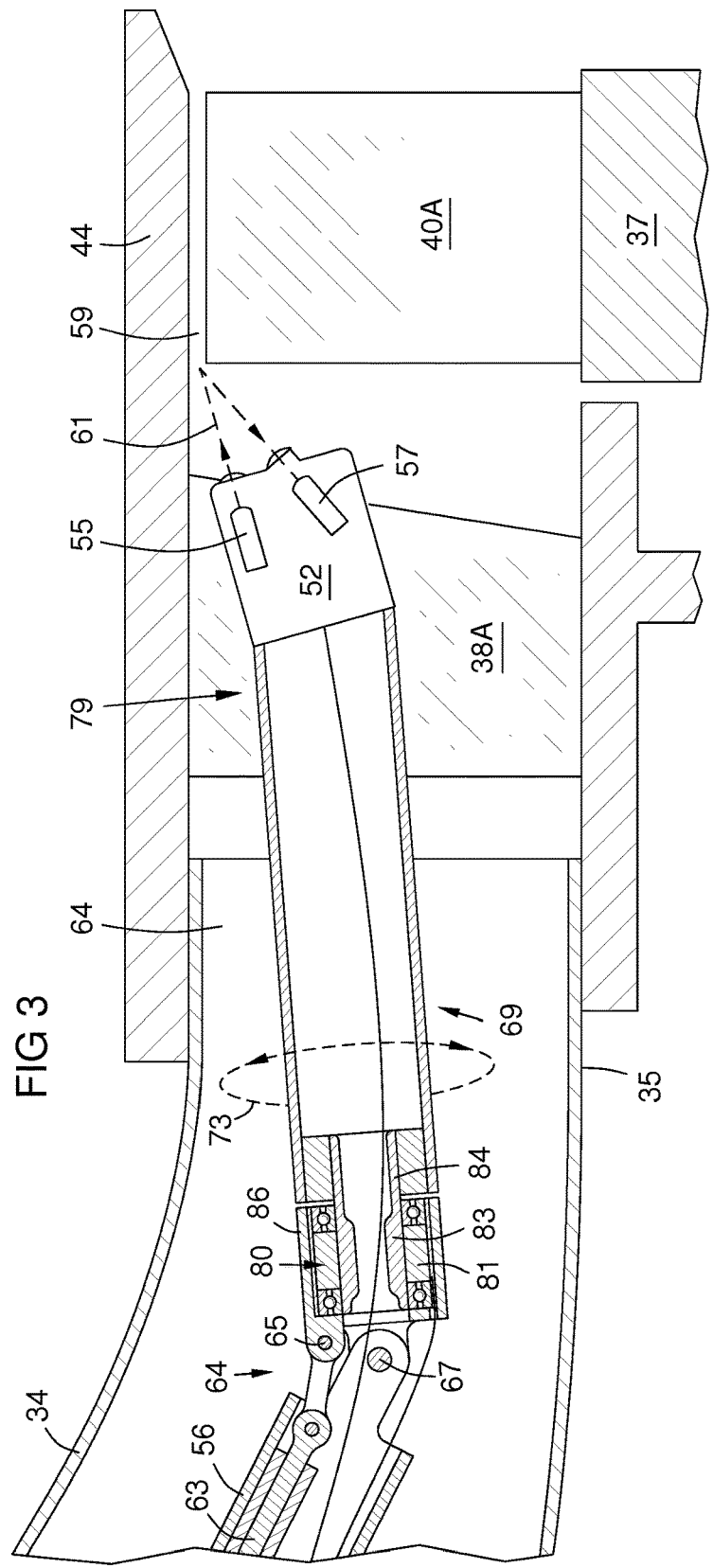
FIG. 3 is a sectional side view of a distal arm of the inspection scope with a non-contact gap identification and measuring device proximate a first row of turbine blades.

The measuring device may be laser scanning and triangulation device such as a Micro-Epsilon® gapCONTROL laser scanner. This device emits a fan-shaped laser beam toward a gap area, and receives diffuse reflection thereof into a sensor that is separated from the emitter for triangulation. From the reflected line image produced by the beam, software triangulates the distance of the gap from the sensor, identifies the gap, and determines the gap width FIG. 3 shows a distal arm 69 connected to an upper arm 56 of the inspection scope by a pivot joint 64 that is robotically controlled by an actuator 63 operating against an offset point 65 relative to a main pivot axis 67. In addition, the distal arm 69 may be robotically rotated 73 via a rotary coupling 86. This may be done for example by means of a hollow stepper motor 80 with a powered stator 81 in the rotary coupling 86 and an unpowered rotor 83 driving a shaft 84 on which is mounted the distal arm 69. Alternately, other robotic pivot and rotation means may be used as known in robotics. The gap measuring device 52 may be mounted on the distal end 79 of the distal arm at a predetermined angle for the laser beam 61 to intersect the gap 59. The above pivot and rotation features provide orientation of the optical axes of the laser emitter 55 and receiver 57 relative to the gap 59. The measuring device 52 is shown here in a schematic side sectional view for clarity. This orients the fan-shaped laser beam 61 in a plane normal to the page. In practice, the laser beam 61 may be oriented in the plane of the page as later shown so that the reflected laser line crosses the gap 59 transversely. The gap measuring device 52 is navigated along a path that extends through the exit end 35 of the transition duct 34 to a position that impinges the laser across the gap 59. The measuring device may be positioned between two vanes 38A as shown, or it may be positioned just ahead of the vanes such that the laser beam 61 is directed between the vanes. On some gas turbines the first row of turbine airfoils is the circular array of blades, not vanes. In such a design the transition duct exit is largely circumferentially oriented, eliminating the need for vanes ahead of the first row of blades.

A method for measuring the gap 59 includes inserting the inspection scope 56, 69 into an inspection port 58 (FIG. 2) of the engine 20; and navigating the measuring device 52 to a position proximate the tip of a blade 40A on the turbine. From this position the gap identification and measuring device 52 identifies and measures the gap 59. This process may be repeated by turning the turbine disk 37 to position the tip of a second blade proximate the distal end of the inspection scope. From this position the gap identification and measurement device 52 identifies and measures the gap between the second blade tip and the surrounding gas path shroud. This may be repeated successively for all of the remaining blades to measure the gap 59 for each blade tip at a given turbine position, such as at top center. Each measurement may be stored in the computer 68.

A technician may operate the computer interactively to navigate the inspection scope into a gap-measuring position. During such navigation the computer may store articulations and/or coordinates of the inspections cope to define a navigation path. The computer may subsequently repeat this predetermined navigation path automatically to position the distal end of the inspection scope.

Figure 4:
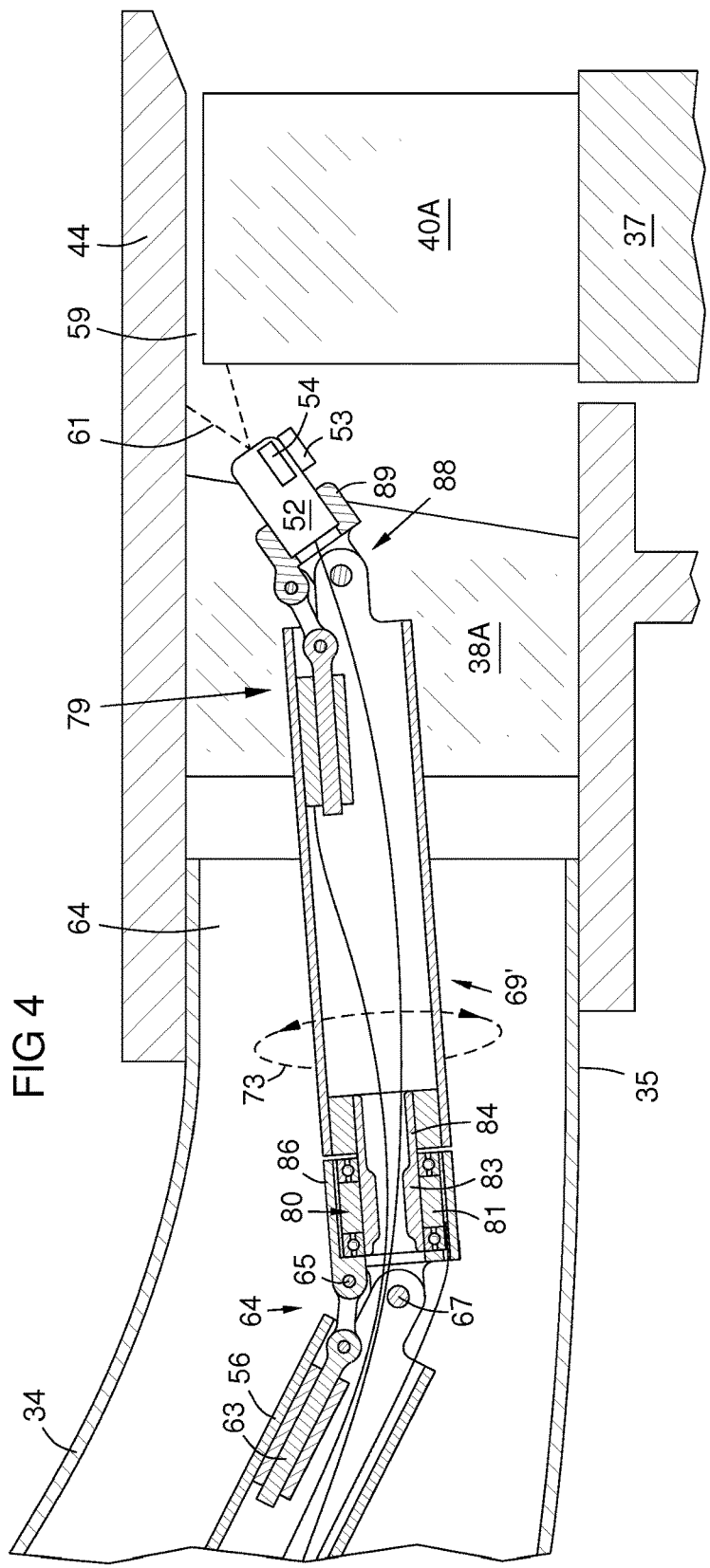
FIG. 4 is a sectional side view of a distal arm of the inspection scope illustrating another aspect of the invention.

FIG. 4 shows an embodiment of the distal arm 69' of the inspection scope with an additional pivot joint 88 that pivots an attachment bracket 89 holding the measuring device 52. Here the measuring device 52 is rotated 90 degrees compared to the view of FIG. 3 to illustrate the fan-shaped laser beam 61 that produces a reflected line transversely crossing the gap 59. The additional pivot joint 88 provides additional flexibility for reaching the measuring position and obtaining an optimum angle of the laser beam 61. A camera 53 such as a USB camera may be attached to the measuring device 52 or the attachment bracket 89 for visual navigation. One or more temperature sensors such as a thermocouple or infrared camera 54 may be attached to the measuring device 52 to sense the temperature of the shroud 44 and of each blade 40A in the proximate position thereof to determine gap width for each blade at the measured position as a function of temperature.

A method in accordance with an embodiment of the invention allows the blade tip-to-shroud gap(s) to be measured without separating the halves of the engine casing, thereby providing an accurate measurement of the gap width as it exists in-situ. Moreover, the gap(s) may be measured while the engine is on turning gear and is being cooled from an operating temperature to ambient following shutdown of the engine.

FIG. 5 is a transverse sectional view of a turbine disk 37 in a turbine section 26. Multiple inspection scopes may be inserted in respective inspection ports at different azimuths, such as two or more of 0, 90, 180, and 270 degrees around the turbine disk to measure a respective gap 59A-D for each blade tip at multiple rotational positions. For example the gaps may be measured at the top (0°) and bottom (180°) of the turbine, or the top, bottom, and opposite sides (90°, 270°) of the turbine disk. Neither the upper half casing 90A nor the lower half casing 90B of the turbine section 26 must be removed for the inspection. With the present invention, measuring the gaps between the tips of the first row of turbine blades 40A and the surrounding gas path shroud 44 can be done in-situ with the engine fully assembled except for removal of one or more pilot fuel nozzles.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of inspecting a gap between a tip of a turbine blade and a surrounding gas path shroud in a gas turbine engine, comprising the steps of:
   a) providing a robotically articulated inspection scope comprising a non-contact gap measuring device on a distal end thereof;
   b) inserting the inspection scope into a pilot fuel port of a combustor of the gas turbine engine without separating halves of a casing of the engine;
   c) robotically navigating the non-contact gap measuring device through the combustor and through a transition duct of the gas turbine engine to a position proximate a gap between a tip of a blade on a turbine disk and a surrounding gas path shroud in the gas turbine engine;
   d) measuring the gap with the non-contact measuring device, and storing a width dimension of the gap in a computer;
   e) rotating the turbine disk to position a next blade of the turbine disk proximate the non-contact measuring device;
   f) repeating from steps d) and e) until gaps associated with a plurality of blades on the turbine disk have been measured;
   sensing a temperature of the gas path shroud and the blade tip, respectively, during the measuring step;
   wherein the non-contact gap measurement device comprises an infrared camera or thermocouple that senses the respective temperatures of the gas path shroud and the blade tip, and
   wherein the first gap width is determined as a function of the respective temperatures.

2. The method of claim 1, further comprising repeating steps d) and e) at a plurality of temperatures as the engine is cooled from an operating temperature to ambient following shutdown of the engine.

* * * * *